(12) United States Patent
Fasen et al.

(10) Patent No.: US 7,733,594 B2
(45) Date of Patent: Jun. 8, 2010

(54) STORAGE DEVICE WITH PULSED MOTOR TORQUE

(75) Inventors: Donald J. Fasen, Boise, ID (US); Vernon L. Knowles, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 12/242,382

(22) Filed: Sep. 30, 2008

(65) Prior Publication Data

US 2010/0079897 A1    Apr. 1, 2010

Related U.S. Application Data

(60) Provisional application No. 61/029,473, filed on Feb. 18, 2008.

(51) Int. Cl.
*G11B 15/46* (2006.01)
*G11B 15/18* (2006.01)

(52) U.S. Cl. .................. 360/73.04; 360/71; 242/334

(58) Field of Classification Search .............. None
See application file for complete search history.

(56) References Cited

U.S. PATENT DOCUMENTS

| 4,396,956 | A | * | 8/1983 | Hedlund | 360/71 |
| 5,327,059 | A | * | 7/1994 | Truong et al. | 318/632 |
| 5,384,675 | A | * | 1/1995 | Crawforth et al. | 360/75 |
| 2008/0156919 | A1 | * | 7/2008 | Bayang et al. | 242/334 |

* cited by examiner

*Primary Examiner*—Andrew L Sniezek

(57) ABSTRACT

A system and method for overcoming adhesion between media and a surface of a storage device in contact with the media. A storage device comprises a media velocity detector and a media drive motor controller. The media velocity detector detects storage media velocity as torque is applied to a storage media. The media drive motor controller causes a media drive motor to apply acceleration torque to the storage media. If the media velocity detector detects no increase in media velocity as acceleration torque is applied to the storage media, then the media drive motor controller causes the media drive motor to apply a torque pulse to the storage media.

20 Claims, 2 Drawing Sheets

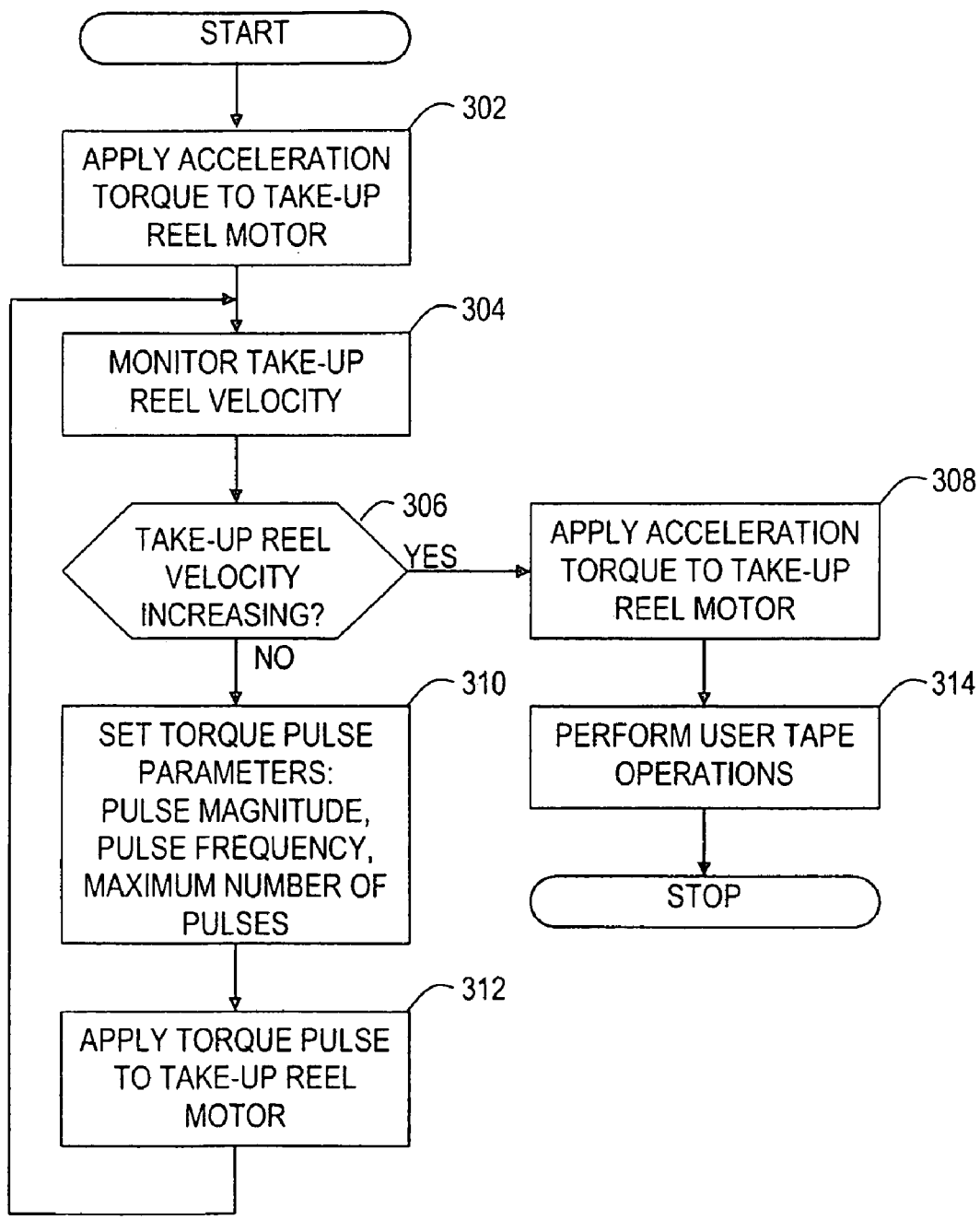

STORAGE DEVICE WITH PULSED MOTOR TORQUE

CROSS REFERENCE TO RELATED APPLICATIONS

This Application claims the benefit of U.S. Provisional Application Ser. No. 61/029,473 filed Feb. 18, 2008, titled "Storage Device With Pulsed Motor Torque" which is hereby incorporated by reference herein as if reproduced in full below.

BACKGROUND

Magnetic storage devices are often included in computer systems to provide high capacity secondary storage or data backup. Magnetic tape systems are a type of magnetic storage device. A magnetic tape system generally comprises a recording media, magnetic tape, and a media access device known as a tape drive or tape transport that reads data from and writes data to the magnetic tape. A magnetic tape typically comprises a flexible narrow ribbon of a base material (e.g., polyester films such as polyethylene naphthalate or polyethylene tereohthalate), and a magnetic material, such as a metal particulate, affixed to the base material by a binding agent (e.g., vinyl chloride polymer). The tape drive accesses the magnetic tape as the tape passes over a set of transducers called "heads." "Write heads" generate magnetic fields which encode data onto the tape as the tape passes over the heads. "Read heads" sense the magnetic fields of the tape's magnetic material to read data from the tape.

Magnetic tape systems are subject to a phenomenon whereby the surface of the magnetic tape adheres to a component of the tape drive, for example the tape head assembly. This phenomenon is sometimes referred to as "stiction." A variety of conditions, including binder formulations and environmental factors, operate to promote stiction. After adhesion occurs, breaking the tape free from the heads may cause damage to the tape surface, or other severe failures including deformation or breaking of the tape media.

A tape's storage capacity may be expanded by increasing the tape's bit density. In order to increase the tape's bit density, the surface of the tape must be made smoother. As the tape's surface is made smoother, the stiction between the tape and heads is exacerbated.

BRIEF DESCRIPTION OF THE DRAWINGS

For a detailed description of exemplary embodiments of the invention, reference will now be made to the accompanying drawings in which:

FIG. 3 shows a flow diagram for a method for releasing magnetic tape stuck to the heads of a tape drive by applying pulsed torque in accordance with various embodiments.

NOTATION AND NOMENCLATURE

Figure 1:
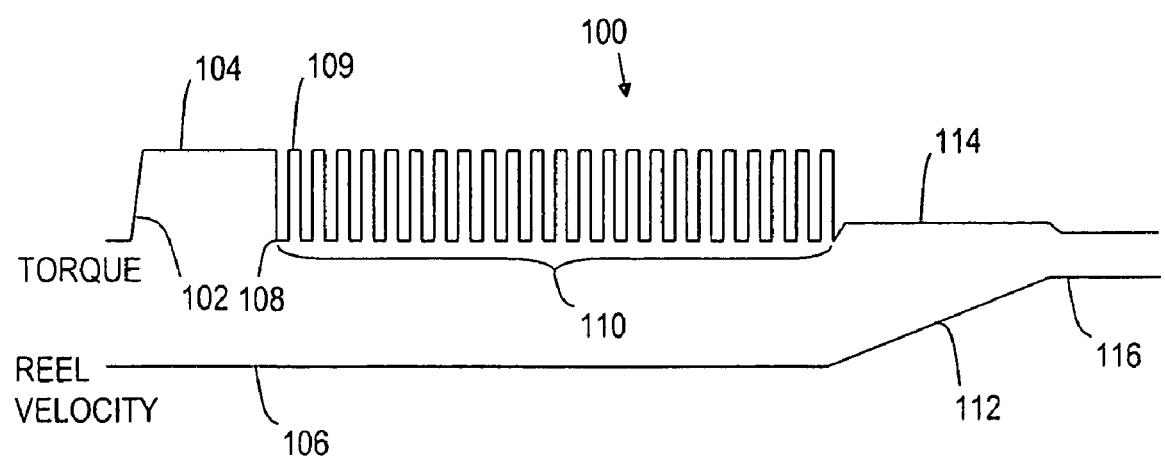
FIG. 1 shows a signal diagram of torque pulses applied to release magnetic tape adhering to the heads of a tape drive in accordance with various embodiments.

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection. The term "system" refers to a collection of two or more hardware and/or software components, and may be used to refer to an electronic device or devices, or a sub-system thereof. Further, the term "software" includes any executable code capable of running on a processor, regardless of the media used to store the software. Thus, code stored in non-volatile memory, and sometimes referred to as "embedded firmware," is included within the definition of software.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Linear tape drives write data to tape in parallel tracks that longitudinally span at least a data region of the tape. Generally, multiple tape heads simultaneously write a number of parallel tracks onto the tape as the tape moves across the heads. As the tape moves across the heads, the tape and heads are separated from one another by a thin layer of air. Without this layer of air to separate the tape from the tape heads, contact between the tape and the tape heads provides an opportunity for adhesion to develop between the tape and heads.

The tape's tendency to adhere to the heads of a linear tape drive is influenced by a variety of factors. Magnetic tape recording requires the tape to be physically close to the head elements during tape access. As tape technology advances, storage density, in terms of the number of bits per inch recorded on tape, increases. To enable reading and writing to tape at increasing bit densities, the distance between the tape and the read and write heads must be reduced. By providing smoother tape and head surfaces, manufacturers are able to lessen the distance between tape and heads. The smoother tape and head surfaces, however, increase the likelihood of adhesion between tape and heads. Wear spots on the tape, for example, locations at which the tape is repetitively stopped (e.g., tape direction reversal locations) become even smoother than the tape in general, further increasing the likelihood of stiction at such points. Additionally, contaminants, such as lubricants from the base film, may build up at stop points further increasing the likelihood that the tape will stick to the heads when stopped. Environmental factors, such as humidity, also influence adhesion between tape and tape heads.

Embodiments of the present disclosure detect stiction that prevents takeup reel rotation. When a stuck tape is detected, embodiments apply a series of torque pulses to a tape reel.

The torque pulses produce tension waves in the tape that facilitate release of the tape from the tape heads. Thus, embodiments of the present disclosure allow for recovery of data from a stuck tape and removal of the tape from the tape drive. Absent recovery methods, as provided by said embodiments, the tape and tape drive are unusable.

FIG. 1 shows a signal diagram of torque pulses applied to release magnetic tape adhering to the heads of a tape drive in accordance with various embodiments. The tape reel is initially stopped (i.e., at zero velocity) 106. Acceleration torque 102, torque intended to increase the velocity of the tape across the heads, is applied to the reel in an attempt to bring the tape to operational velocity. Maximum torque 104 is applied to the reel motor in an attempt to move the tape for a predetermined duration, for example, approximately one second. Embodiments monitor tape velocity and upon determining that maximum continuous torque 104 has failed to increase reel velocity 106, the drive ascertains that the tape may be stuck to the tape heads or another tape drive surface. In order to free the tape from the tape heads, the tape drive applies a series of torque pulses 110 to the tape reel. Each torque pulse comprises a period of lower torque 108 (e.g., no torque applied) and a period of higher torque 109 (e.g., the maximum torque that the tape drive is capable of providing). Applying torque pulses at a particular frequency and magnitude is effective at releasing the tape from the tape heads. The torque pulses produce a tension wave through the tape that helps release the tape from the tape head without damaging the tape. Torque pulse parameters, for example, frequency, magnitude, and duration of lower and higher torque levels, effective for releasing the tape may vary according to such factors as tape path configuration and/or tape materials. As shown, a torque pulse may transition from a lower torque to a higher torque more rapidly than the acceleration torque 102 transitions from the lower torque to the higher torque, In some embodiments, an effective frequency and magnitude may comprise, for example, approximately ten pulses per second and maximum drive torque respectively. Embodiments finding torque pulses using a first selection of torque pulse parameters ineffective at releasing the tape within a predetermined time period (e.g., two seconds) may attempt to free the tape using a different torque pulse parameter selection.

During application of torque pulses 110, embodiments continue to monitor tape reel velocity. When the torque pulses 110 release the tape from the tape heads and the reel velocity begins to increase 112, the torque pulses 110 are discontinued and normal reel acceleration torque 114 is applied to bring the tape to operational velocity 116. If a predetermined maximum number of torque pulses 110 are generated without a resultant increase in tape velocity, then as described above, another set of torque pulses defined by different torque pulse parameters (e.g., magnitude, frequency) may be applied to release the tape from the tape heads.

Figure 2:
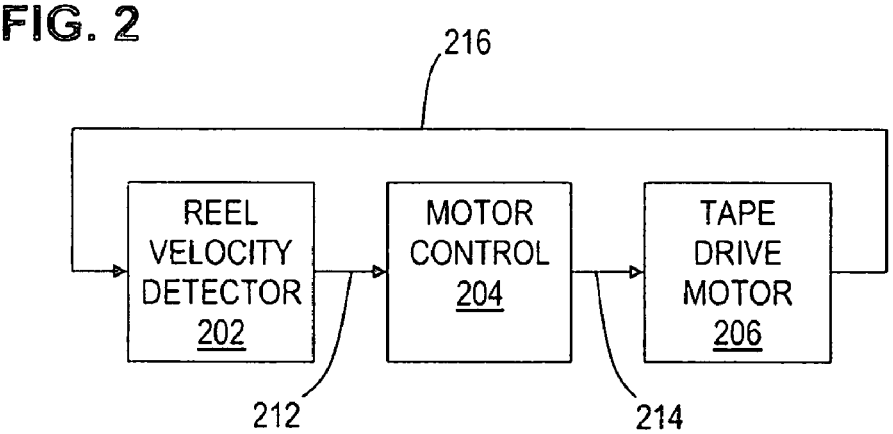
FIG. 2 shows a block diagram of a tape drive that applies pulsed torque to release magnetic tape adhering to the heads of the tape drive in accordance with various embodiments.

FIG. 2 shows a block diagram of a tape drive that applies pulsed torque to release magnetic tape adhering to the heads of the tape drive in accordance with various embodiments. The exemplary tape drive comprises a tape reel velocity detector 202, a reel motor controller 204, and tape drive motor 206. The tape reel velocity detector 202 monitors tape speed by, for example, determining the rotational velocity of a tape reel. Embodiments determine reel velocity and/or tape speed by a variety of methods. In some embodiments, the tape drive motor 206 comprises a Hall Effect sensor, optical sensor, magnetic sensor, etc. that provides a signal indicative of the rotational speed of the motor. For example, in some embodiments signal 216 comprises a predetermined number of voltage pulses per motor 206 rotation. The rate at which the voltage pulses are generated being indicative of the rotational speed of the motor 206. In some embodiments signal 216 may comprise tape speed information based on the rotation of the tape reel or a tape roller, or based on information decoded from the tape as it moves across the tape heads, or a combination of such information.

The reel velocity detector 202 processes the information provided by signal 216 to estimate tape velocity. Embodiments perform tape velocity estimation using, for example, a timer to measure the time between signal 216 pulses and a microprocessor with software programming to compute tape velocity. Embodiments may also perform velocity estimation using dedicated hardware circuitry.

Estimated tape velocity 212 is provided to the motor controller 204. To control tape velocity, the motor controller 204 provides torque control signal 214 to drive motor 206. To bring the tape from zero velocity to operational velocity, the motor controller 204 asserts signal 214 to cause the drive motor 206 to apply acceleration torque to the tape reel. The motor controller 204 monitors estimated tape velocity 212 during application of acceleration torque to determine whether the tape is moving freely across the tape heads. If after a predetermined time interval, application of acceleration torque has not resulted in tape movement, the motor controller 204 establishes that the tape is stuck to the tape heads or other tape drive surface. Further application of acceleration torque to the stuck tape may be ineffective at releasing the tape from the tape heads, or may result in tape damage such as breaking of the tape. Rather than continuing to try to free the tape by continuous application of acceleration (e.g. maximum) torque, embodiments apply pulsed torque after ascertaining that the tape is stuck. Torque pulses 110 comprise an oscillation between a low torque value 108 (e.g., zero torque) and a higher torque value 109 (e.g., maximum torque produced by the tape drive). Applying torque pulses 110 at a particular frequency and magnitude is effective at releasing the tape from the heads.

While causing the drive motor 206 to apply torque pulses 110 to the tape reel, the motor controller 204 continues to monitor the estimated tape velocity 212. When estimated tape velocity 212 indicates that the tape has been freed from the tape heads, the motor controller 204 ceases application of pulsed torque and applies acceleration torque to bring the tape to operational velocity. Torque pulses 110 are discontinued after application of a predetermined number of pulses. If torque pulses generated using a particular set of parameters (e.g., pulse magnitude, frequency, etc) fail to free the tape from the heads, then an embodiment of the motor controller 204 may produce additional torque pulses of a different frequency and/or magnitude to affect release of the tape. The frequency, magnitude, or number of torque pulses effective for releasing the tape from the heads may vary based on, for example, tape drive configuration and/or tape composition. Consequently, embodiments allow the parameters of the torque pulses to be modified to optimize tape release without tape damage. For example, while approximately 10 pulses per second, each pulse applying maximum drive torque may effectively release current generation tape from the drive heads, a next generation tape may be constructed using a thinner backing necessitating a different pulse magnitude and/or frequency to release the tape without damage.

Some embodiments "sweep" the torque pulse frequency from a first selected frequency value (e.g., a lower frequency) at the initiation of torque pulsing to a second selected frequency value (e.g., a higher frequency) at a later selected torque pulse. The rate of frequency change may be linear or non-linear, and the torque pulses may sweep from low-tohigh frequencies or high-to-low frequencies to best effectuate tape release without damaging the tape.

Embodiments of the motor controller 204 may be implemented using a microprocessor and associated software programming. The range of applicable torque pulse parameters, including initial and alternate parameter sets, is defined within the software programming. Embodiments may also be implemented using dedicated circuitry, either discrete or integrated, to perform motor control.

FIG. 3 shows a flow diagram for a method for releasing magnetic tape stuck to the heads of a tape drive by applying pulsed torque in accordance with various embodiments. Though depicted sequentially as a matter of convenience, at least some of the actions shown can be performed in a different order and/or performed in parallel. In block 302, the tape velocity is zero as occurs, for example, at the tape turn-around points in linear serpentine tape drives, or when the tape drive requires that the host add or remove data from the drive's buffer before continuing, or for a variety of other reasons. In order to bring the tape to operational velocity, the tape drive applies acceleration torque to the tape reel.

As acceleration torque is applied to the tape reel, the take-up reel velocity is monitored, in block 304, to determine whether the tape is moving. Embodiments employ a variety of methods to determine whether the tape is moving, including for example, monitoring drive motor velocity, monitoring tape reel velocity, monitoring tape roller velocity, and decoding tape signals. If, in block 306, tape velocity, as measured by take-up reel velocity or other means, is found to be increasing, the acceleration torque is maintained, in block 308, to bring the tape to operation velocity. Once the tape reaches operational velocity, user operations, such as reading data from tape or writing data to tape are performed in block 314.

If, in block 306, the reel velocity does not increase with application of acceleration torque, adhesion of the tape to the tape head is likely and damage to the tape may result from continuous application of uninterrupted high levels of torque. Therefore, embodiments discontinue application of continuous torque, and apply torque pulses to the tape reel in order to effectuate release of the tape from the heads.

In block 310, torque pulse parameters are selected. Parameters relevant to the torque pulses include, for example, pulse magnitude, pulse frequency, and the maximum number of pulses to apply. The values of these parameters may be selected based on their effectiveness in releasing the tape from the head without damage. For example, embodiments may set pulse magnitude to maximum drive torque, or may select a reduced torque level if application of maximum torque pulses results in tape damage. Embodiments select a maximum number of torque pulses to apply before discontinuing pulse generation if the torque pulses fail to release the tape.

A torque pulse is applied to the reel motor in block 312. A series of torque pulses produces a tension wave in the tape that causes the tape to release from the head. The tape drive continues to monitor tape velocity, in block 306, to determine whether the torque pulses have released the tape from the head. If the tape velocity is found to be increasing, in block 306, then torque pulsing is discontinued and acceleration torque is applied to the reel motor in block 308. User tape operations are performed, in block 314, after the tape reaches operational velocity.

If, on the other hand, the tape is not accelerating, in block 306, further torque pulses are applied, in blocks 310-312. Embodiments apply torque pulses generated using a selected set of parameters unless the maximum selected number of pulses is generated without affecting release of the tape from the heads, in which case embodiments may select a new set of torque pulse parameters and continue applying torque pulses based on the new parameters.

The above discussion is meant to be illustrative of the principles and various embodiments of the present invention. Numerous variations and modifications will become apparent to those skilled in the art once the above disclosure is fully appreciated. For example, while the exemplary embodiments have been described in reference to magnetic tape storage, those skilled in the art will recognize that embodiments may be applied to disk drives and other storage devices experiencing stiction between storage media and a surface of the storage device. It is intended that the following claims be interpreted to embrace all such variations and modifications.

What is claimed is:

1. A storage device, comprising:
a media velocity detector that detects storage media velocity as torque is applied to a storage media; and
a media drive motor controller that causes a media drive motor to apply acceleration torque to the storage media;
wherein the media drive motor controller causes the media drive motor to apply a torque pulse to the storage media based on the media velocity detector detecting no increase in media velocity as acceleration torque is applied to the storage media;
wherein the media drive motor controller causes the torque pulse to transition from a lower torque to a higher torque more rapidly than the acceleration torque transitions from the lower torque to the higher torque.

2. The storage device of claim 1, wherein the media drive motor controller causes the media drive motor to apply a plurality of torque pulses to the storage media if the media velocity detector detects no increase in media velocity as acceleration torque is applied to the storage media.

3. The storage device of claim 1, wherein the media drive motor controller selects a torque pulse magnitude value, a torque pulse frequency value, and a torque pulse quantity value from a plurality of torque pulse magnitude values, torque pulse frequency values, and torque pulse quantity values.

4. The storage device of claim 3, wherein the media motor drive controller selects the magnitude value, frequency value, and quantity value based on one of composition of the storage media and a media path configuration of the storage device.

5. The storage device of claim 1, wherein the media drive motor controller causes the media drive motor to repetitively apply the torque pulse to the storage media until the media velocity detector detects media acceleration.

6. The storage device of claim 1, wherein the magnitude of the torque pulse applied to the media drive motor is the maximum torque provided by the storage device.

7. The storage device of claim 1, wherein the media drive motor controller changes at least one torque pulse parameter and causes the media drive motor to apply an additional torque pulse based on the changed parameter to the storage media based on a maximum selected number of torque pulses being applied to the storage media without accelerating the media.

8. The storage device of claim 1, wherein the storage media is magnetic storage media.

9. The storage device of claim 1, wherein the media drive motor controller causes the media drive motor to apply a plurality of torque pulses per second to the storage media if the media velocity detector detects no increase in media velocity as acceleration torque is applied to the storage media.

10. A method, comprising:
applying acceleration torque to a storage media of a storage device;
monitoring storage media velocity;
determining that media velocity is not increasing as acceleration torque is applied to the storage media; and
applying a torque pulse to the storage media to overcome adhesion between the media and a storage device surface in contact with the media;
wherein the torque pulse transitions from a lower torque to a higher torque more rapidly than the acceleration torque transitions from the lower torque to the higher torque.

11. The method of claim 10, further comprising applying a plurality of torque pulses to the storage media to overcome adhesion between the media and a storage device surface in contact with the media.

12. The method of claim 11, further comprising selecting a frequency for the torque pulses applied to the storage media from a plurality of torque pulse frequencies provided by the storage device.

13. The method of claim 11, further comprising applying torque pulses to the storage media until an increase in media velocity is detected.

14. The method of claim 11, further comprising:
selecting a torque pulse sweep start frequency and a torque pulse sweep end frequency from a plurality of different start and end frequencies; and
applying the plurality of torque pulses beginning at the selected start frequency and stopping at the selected end frequency.

15. The method of claim 10, further comprising selecting a torque pulse magnitude from a plurality of torque pulse magnitudes provided by the storage device.

16. The method of claim 10, further comprising discontinuing application of torque pulses to the storage media if media acceleration is detected during application of torque pulses.

17. The method of claim 10, further comprising changing a torque pulse parameter based on a maximum selected number of torque pulses applied to the storage media failing to effectuate media acceleration.

18. A tape drive, comprising:
means for determining that a magnetic tape is adhering to a surface of the tape drive during application of acceleration torque;
means for applying a torque pulse to a magnetic tape reel to release the magnetic tape from a tape drive surface;
wherein the means for applying the torque pulse causes the torque pulse to transition from a lower torque to a higher torque more rapidly than the acceleration torque transitions from the lower torque to the higher torque.

19. The tape drive of claim 18, wherein the means for applying a torque pulse applies a plurality of torque pulses to the tape reel to release the magnetic tape from the tape drive surface.

20. The tape drive of claim 18, wherein the means for applying a torque pulse selects torque pulse parameters, and changes at least one parameter of a second plurality of torque pulses applied to the reel based on a first plurality of torque pulses applied to the reel failing to release the magnetic tape from the tape drive surface.

* * * * *